United States Patent [19]
Christensen

[11] 3,882,558
[45] May 13, 1975

[54] SUSPENSION SYSTEM FOR OVERLAND VEHICLES SLEEPING BEDS

[76] Inventor: Sheldon L. Christensen, 1963 E. 9th St., Fremont, Nebr. 68025

[22] Filed: Aug. 8, 1974

[21] Appl. No.: 495,624

[52] U.S. Cl. ................... 5/118; 248/400; 296/28 C
[51] Int. Cl. ........................................... A45f 1/00
[58] Field of Search ............... 296/23, 28 C; 5/118; 297/304, 307, 347; 248/399, 400

[56] References Cited
UNITED STATES PATENTS

| | | | |
|---|---|---|---|
| 3,067,437 | 11/1962 | Campbell | 5/118 |
| 3,371,359 | 3/1968 | Dome | 5/118 |
| 3,724,797 | 4/1973 | Freitag et al. | 248/400 |

*Primary Examiner*—Casmir A. Nunberg
*Attorney, Agent, or Firm*—George R. Nimmer

[57] ABSTRACT

Disclosed are suspension systems including a horizontal top-frame underlying a sleeping mattress and adapted for ready installation within overland vehicles such as upon the lofty rearward shelf-like stratum of a truck operator's cab. The suspension system generally comprises: a horizontal elongated bottom-frame adapted to stably rest upon the shelf-like stratum and provided with a pair of longitudinally separated revolvable drums each rotatable about a transversely extending central-axis, a longitudinally lengthwise horizontal top-frame overlying the bottom-frame and in vertically reciprocatable relationship therewith through connection to the respective revolvable drums therebeneath, leveling means preferably as a figure-8 taut cable rigidly attached to the drums to maintain the top-frame horizontal during vertical movements thereof, and downward-movement limitation means for the top-frame of the yieldable resistance type and preferably of the Boyles' Law gas spring or shock-absorber type and also providing comfort to the reclining passenger, together with desireable compensator means for passenger weight.

9 Claims, 5 Drawing Figures

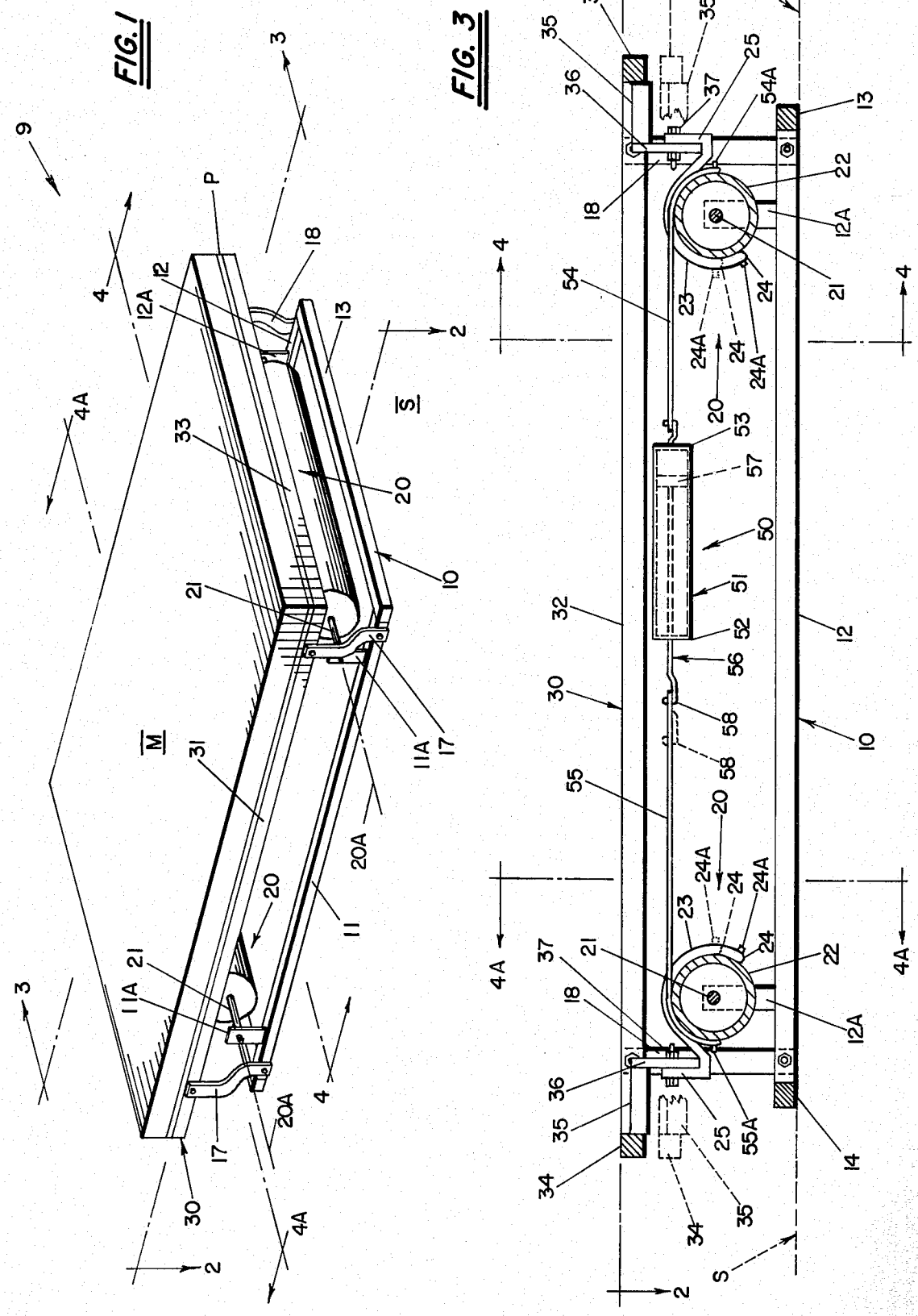

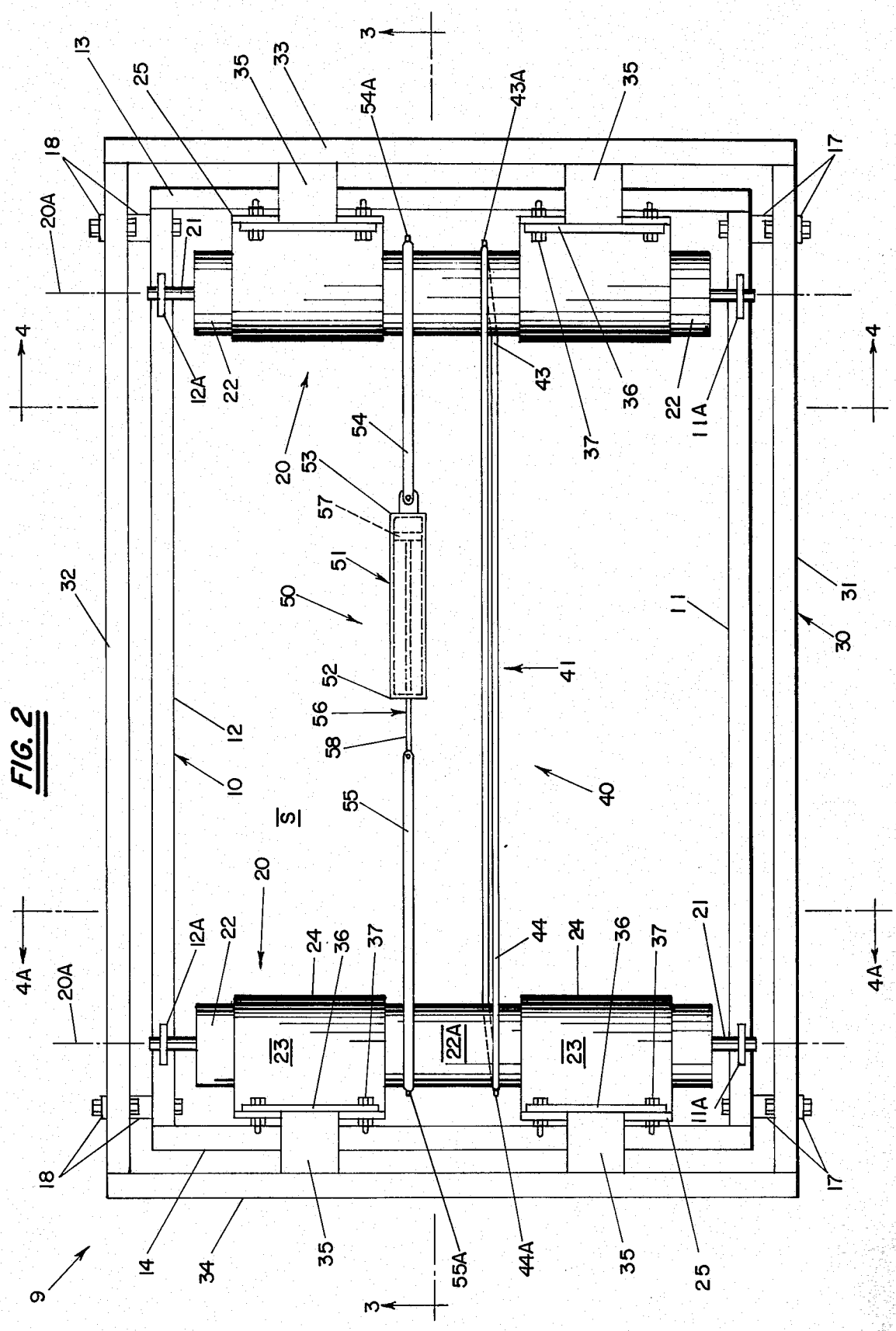

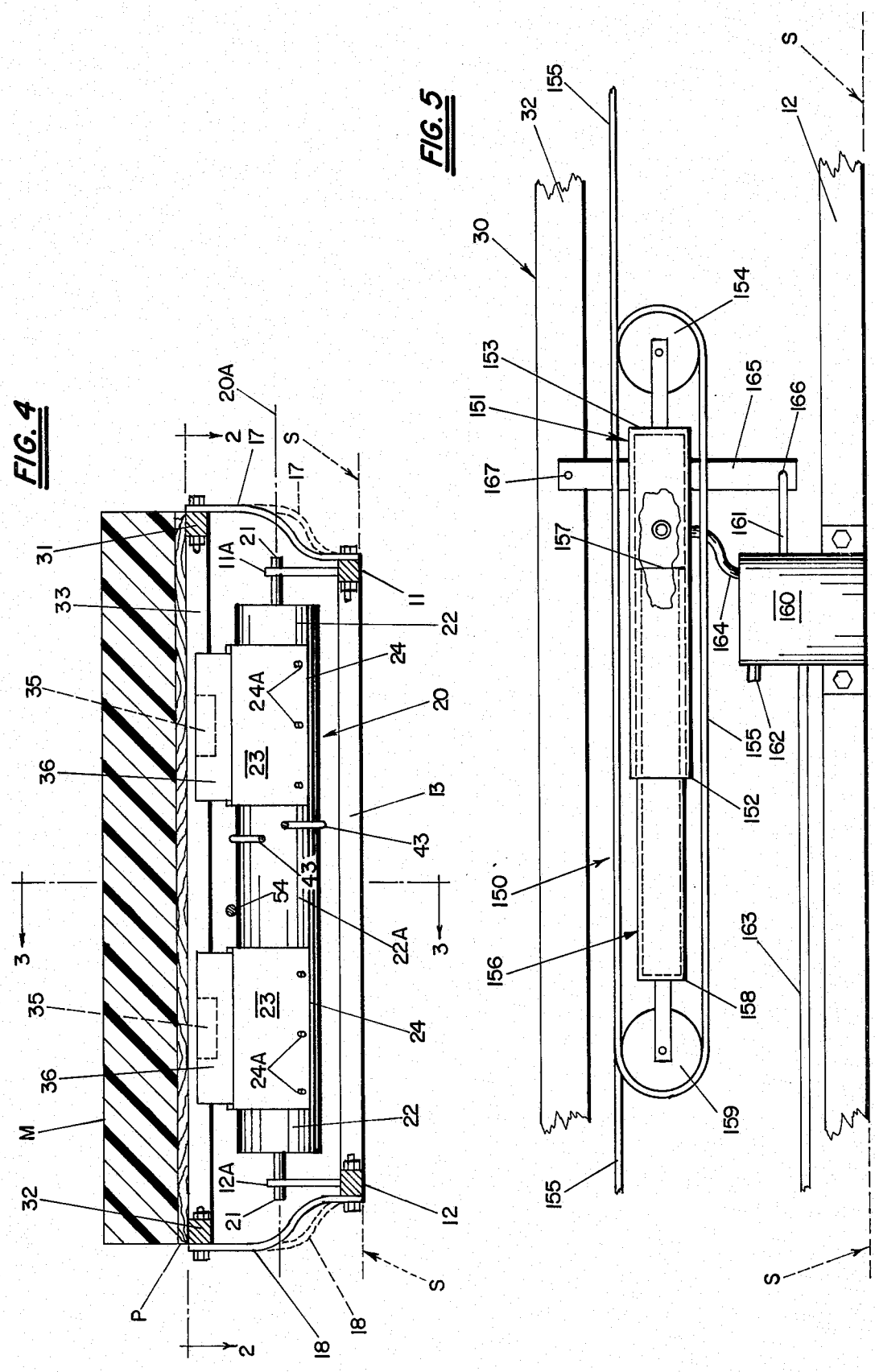

SUSPENSION SYSTEM FOR OVERLAND VEHICLES SLEEPING BEDS

For overland vehicles, it is common practice to provide a sleeping compartment in which a mattress or the like can be placed upon which passengers or operating personnel may recline and rest. For example, for over-the-road cargo trucks, the sleeping compartment is normally the lofty shelf-like stratum portion at the rearward area of the operator's cab. Where the truck is being driven by a single driver, no particular problem is encountered since, in order to obtain the desired rest, the truck is necessarily stationary when the driver is sleeping. However, in order to substantially increase the number of hours of operation of the truck to meet rigid delivery schedules, two drivers are frequently assigned to a single vehicle, with one of the drivers resting while the other is driving. As will be appreciated, attempting to sleep under driving conditions can be difficult, particularly when rough road conditions are encountered.

Attempts have been made in the past to provide supplemental underlying supporting means for sleeping mattresses or the like in order to provide a more comfortable supporting surface and one which is relatively more immune to rough road conditions. However, these prior art supplementary supporting systems have been less than completely satisfactory for a number of reasons, including the lack of simple and reliable cushioning means which will compensate passengers of various body weights. Moreover, the problems are compounded because of economics and because of the very limited vertical space available at the truck cab rearward loft or shelf.

It is accordingly the general object of the present invention to provide underlying suspension systems for mattresses or the like which overcome the several disadvantages and deficiencies of prior art structures, and particularly to accomplish the objective economically, reliably, and meeting the rigorous exigiencies of overland truck driving conditions and minimal available space therewithin assignable to sleeping compartment.

With the above and other objects and advantages in view, which will become more apparent as this description proceeds, the underlying suspension system for sleeping beds generally comprises: a longitudinally lengthwise and transversely widthwise horizontal bottom-frame adapted to stably rest upon a suitable underlying environmental stratum such as the lofty shelf-like stratum at the elevated rearward end of an overland truck operator's cab, the bottom-frame being provided with a pair of longitudinally separated revolvable drums each rotatable about a transversely extending horizontal central-axis; a generally rectangular horizontal top-frame overlying the bottom-frame and drums and in vertically reciprocatably movable condition through connection to the respective underlying drums, said top-frame extending longitudinally lengthwise and having a relatively narrow transversewidth to support a horizontal mattress thereupon; leveling means (preferably comprising a figure-8 shape taut cable surrounding the drums' central-axes and rigidly attached to the drums) for maintaining the top-frame horizontal during vertical movements thereof; and downward-movement limitation means of the decreasingly yieldable resistance type for the top-frame and desireably comprising a gaseous spring or shock-absorber means and preferably as a telescoping tubes pneumatic shock-absorber and sometimes too equipped with load-leveler valve actuatable by the moving top-frame as a compensator means.

In the drawing, wherein like characters refer to like parts in the several views, and in which:

FIG. 1 is a perspective view of a representative embodiment of the suspension system for reclining beds, upper horizontal strata including mattress "M" atop a plywood stiffener-board "P" which itself rests directly against the vertically reciprocatable top-frame.

FIG. 2 is a top plan view of the suspension system embodiment itself and taken along section lines 2—2 of FIGS. 1, 3, and 4.

FIG. 3 is a sectional elevational view taken along lines 3—3 of FIGS. 1, 2, and 4.

FIG. 4 is a sectional elevational view taken along lines 4—4 of FIGS. 1-3, FIG. 4A(not shown) being a substantial mirror image thereof.

FIG. 5 is a detail elevational view like FIG. 3 but showing an alternate form downward-movement limitation means and of the gaseous spring or shock-absorber type.

Representative embodiment 9 of the suspension system for horizontal sleeping beds (herein comprising rectangular mattress M overlying rectangular plywood board P) generally comprises: a longitudinally lengthwise horizontal bottom-frame 10 adapted to stably rest at constant elevation upon a suitable underlying stratum such as the lofty shelf "S" of an overland vehicle operator's cab; a pair of longitudinally separated horizontal drums 20 revolvably associated with bottom-frame 10 and each drum rotatable about a transversely extending horizontal central-axis 20A; a generally rectangular horizontal top-frame 30 overlying bottom-frame 10 and in vertically reciprocatably movable relationship therewith through connection (e.g. 23–24A) to the respective underlying drums 20; leveling means preferably comprising a taut cable (e.g. figure-8 shape cable 40) acting through both drums 20 for maintaining the top-frame 30 horizontal during vertical movements thereof; and downward-movement limitation means for the top-frame and said means being preferably of the decreasingly yieldable resistance type(e.g. 50, 150). The horizontal bottom-frame type 10 depicted in the drawing is of rectangular configuration and extends longitudinally lengthwise (FIG. 3) and transversely widthwise (FIG. 4). Herein, rectangular bottom-frame 10 comprises four rigidly-interconnected rails 11–14 together defining a horizontal plane at S and including two parallel longer longitudinal rails (left-rail 11 and right-rail 12) and two parallel shorter transverse rails (fore-rail 13 and aft-rail 14). Bottom-frame 10 is thus adapted to stably rest at constant elevation upon a suitable underlying uniplanar stratum such as the lofty shelf S of an overland truck operator's cab.

There is a pair of longitudinally separated horizontal cylindrical drums 20 each rotatable about a transversely extending horizontal central-axis 20A and revolvably associated with bottom-frame 10. In this vein, each drum 20 includes a horizontal central-shaft 21 lying along central-axis 20A which horizontal shaft 21 is revolvably attached to a pair of lugs 11A and 12A extending rigidly upwardly from left-rail 11 and right-rail 12, respectively. Herein, the cylindrical surfaces 22 for the respective drums 20 are of like circular shape and diameter.

The horizontal top-frame embodiment 30 is preferably of the rectangular shape seen in FIG. 2 and extends longitudinally lengthwise (FIG. 3) of slightly greater extent than does bottom-frame 10 and also extends transversely widthwise (FIG. 4) for a relatively narrow transverse-width (e.g. 31–32) which exceeds the dimensional width 11–12 of bottom-frame 10. Rectangular top-frame 30 herein comprises four rigidly-interconnected rails 31–34 together defining a horizontal plane and including two parallel longer rails (leftward-rail 31 and rightward-rail 32) and two parallel shorter transverse rails (forward-rail 33 and rearward-rail 34). The uniplanar horizontal upperside of top-frame 30 is thus adapted to support thereupon a horizontal rectangular plywood stiffener-board P onto which is superimposed the horizontal rectangular reclining mattress M.

Top-frame 30 is in vertically reciprocatably movably attached relationship with the bottom-frame (10) through connection to the two revolvable drums (20). A preferred type such connection comprises flexible sheet material strips 23 at least partially wrapped around the drum circular periphery 22, the transverse fore-end 24 only of each strip 23 being fixedly attached to the drum 20 as by mechanical fasteners 24A or adhesive. Depending from the horizontal extensions 35 of the respective transverse rails 33 and 34 of top-frame 30 are upright plates 36 to the lower end of which is attached (as through rivets 37) the transverse U-end 25 of each arcuate strip 23. Inasmuch as drums 20 at circular surface 22 are of equal diameter, vertical movement of top-frame 30 forces drums 20 to rotate equal angular extents about central-axes 20A. And preferably, as best seen in FIG. 3, inasmuch as the restrained fore-ends 24 inwardly face each other, vertical movement of the topframe (provided it remains horizontal) causes drums 20 to rotate in opposite angular directions about central-axes 20A. For suspension embodiment 9, there is for each drum 20 a pair of identical arcuate strips 23 with a transversely extending spatial gap 22A therebetween, and accordingly too two sets of members 35–37 for each drum 20.

There are leveling means to maintain the top-frame (30) horizontal during vertical movements thereof thereby too maintaining the reclining person (e.g. atop mattress M) in a near perfectly horizontal position. The preferred leveling means comprises a longitudinally extending taut cable (e.g. 40) lying within a substantially vertical-plane (FIG. 2) located about midway the frames longitudinal terminii (e.g. midway 11 and 12) herein too midway 31 and 32 at gap 22A. For the preferred type figure-8 configuration taut cable (40), the cross-over point (41) lies substantially midway the frames' longitudinal length (e.g. midway 13 and 14, midway 33 and 34). The two loops 43 and 44 of figure-8 cable 40 encircle the respective drum central-axes 20A and are rigidly attached to the outward side of each drum 20. Herein, forward-loop 43 is rigidly attached (as by rivet 43A) to the outward surface 22 at drum gap area 22A, and rearward-loop 44 is similarly rigidly attached (as by rivet 44A) to the outward side of the other drum's surface 22 at area 22A. Thus, as indicated in phantom lines in FIGS. 3 and 4, top-frame 30 is forced to remain horizontal through its vertical movements (upward or downward) by virtue of herein figure-8 shape cable 40 which tautly extends between and is rigidly attached to the respective revolvable drums 20. As previously mentioned, the drums 20 possess equal circular diameters 22 and taut cable 40 ensures that the drums 20 rotate in opposite angular directions and extent about the respective central-axes 20A (e.g. phantom line 24A in FIG. 3).

The suspension system desireably includes upward-movement limitation means to maintain the top-frame (30) intact with the bottom-frame (10) and intermediate elements (e.g. drums 20) during interim storage, handling, shipment, and installation for the apparatus (9). In this vein, there are four flexible upright straps 17 and 18 connecting the top-frame 30 to the bottom-frame 10. Herein, two upright straps 17 connect the rails 11 and 31 and two similar upright straps 18 connect the rails 12 and 32.

There is necessarily downward-movement limitation means actuatably extending from the top-frame (30) to prevent its slamming downwardly against the bottom-frame (10) and substrate (S) and to ancillarily give resilient cushioning to the reclining occupant (e.g. at M). In these vein, the downward-movement limitation means is of the yieldable resistance type and preferably of increasing resistance progressively as the top-frame approaches the bottom-frame. For such purposes, at least one horizontal gaseous spring or shock-absorber (50) having a constant working gaseous molecular content and accting in substantial accordance with Boyles' Law and moreover acting through the respective revolvable drums (20) is preferred. One such gaseous spring embodiment 50 as shown in FIGS. 2 and 3 comprises a horizontal outer cylindrically tubular casing 51 having a fully-closed end 53 and a centrally-open end 52, and together with an upper horizontal plunger member 56 having an upright flanged portion 57 horizontally reciprocatably positioned within casing 51. The plunger member 56 extends horizontally through the centrally-open end 52 of the casing 51 as piston-part 58. There is a constant molecular content of air within casing 51 located between plunger flange 57 and casing end 52, and accordingly, the said confined air content obeys Boyles' Law as plunger 56 horizontally reciprocates. Casing 51 is rigidly attached through elongate horizontal flexible band 54 to the drum 20 area 22A as with rivet 54, and the plunger 56 at 58 is similarly rigidly attached through horizontal flexible band 55 to the other drum's area 22A as with rivet 55A. Thus, as indicated in phantom line in FIG. 3, as top-frame 30 descends and too drums 20 rotate in opposite angular directions, the plunger flange 57 moves toward the casing closed-end 52 to compress the confined air according to Boyles' Law, the progressively increasing resistance offering comfort to an occupant reclining upon mattress M;

Pronounced operational limitations are encountered with the conventional casing-plunger configuration pistons (e.g.50) in view of the limited gas molecular content confineable per casing (51) internal volume and the flange(57) therein. However, with the telescoping tubes (e.g. 151, 156) configuration piston shock-absorber(150) of FIG. 5, greater workable volumes of confined air are possible and attendantly more practical comfort potential to the reclining passenger (at M). Herein, piston 150 comprises a horizontal cylindrical outer-tube 151 having a closed-end 153 and a fully-open-end 152 and an upright terminal pulley 154 attached to outer-tube closed-end 153. Piston 150 also comprises a horizontal cylindrical inner-tube 156 having a closed-end 158(to which is attached an upright terminal pulley 159) and having a fully-open-end 157 located inside outer-tube 151. Tubes 151 and 156 are horizontally slidably engaged with each other, unusually large gas molecular contents being confineable between the very extensively separated closed-ends 153 and 158. Herein, a single cable-band 155 passes around both pulleys 154 and 159, the two terminii of horizontal cable-band 155 being attached (as with rivets 54A and 55A) to the respective drums 20 at 22A. Thus, as appreciated from FIGS. 5 and 3, as the top-frame 30 moves downwardly, the closed-ends 153 and 158 of piston embodiment 150 are forced to move toward each other thereby compressing the confined gas.

As further alluded to in FIG. 5, the compressed gas can be introduced into piston 150 through an elongate airhose 164 communicating with another airhose 163 extending from the vehicle's mechanical compressor (not shown). Moreover, a conventional load-leveler valve 160 having air exhaust-port 162 is desireably interposeable at the juncture of airlines 163 and 164, valve 160 herein being attached to the bottom-frame right-rail 12 and located wholly below topframe 30 and shock-absorber 150. The conventional load-leveler valve 160 inclides a generally horizontal lever 161 for controlling the proportion of air emitted through exhaust-port 162 and airline 164. Herein employed is an upright link pivotably connected at its lower end 166 to lever 161 and at its upper end to top-frame rightward-rail 32. Thus, it is readily seen that as the top-frame 30 moves downwardly, valve lever 161 is thereby also motivated and the proportion of air emitted through port 162 and airline 164 steadily changes. Accordingly, this steady proportionate change inherently provides comfort (through the intervention of shock-absorber or spring 150) to reclining passengers thereby compensating for variations in passengers' body weights.

For the foregoing, the construction and operation of the suspension systems for overland vehicles beds will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:

1. A suspension system for overland vehicles sleeping beds and particularly adapted for removably resting upon the rearward elevated shelf-like stratum portion of an overland truck operator's cab, said suspension system comprising:

A. A substantially horizontal bottom-frame adapted to stably rest at constant elevation upon a said shelf stratum, the bottom-frame extending longitudinally lengthwise and also transversely widthwise and including a pair of longitudinally separated transverse-ends, said bottom-frame being provided with a pair of longitudinally separated revolvable drums each rotatable about a transversely extending central-axis therefor whereby an elongated longitudinal-gap exists between the two central-axes;

B. A generally rectangular horizontal top-frame overlying the bottom-frame and in vertically reciprocatably movably attached relationship thereto through connnections to the respective revolvable drums, said top-frame extending longitudinally lengthwise and having a relatively narrow transverse-width and adapted to support a horizontal sleeping mattress thereabove;

C. Leveling means to maintain the top-frame horizontal during vertical movements thereof; and D. Downward-movement limitation means of the yieldable resistance type for the top-frame and extending actuatably therefrom to the constant elevation bottom-frame.

2. The suspension system of claim 1 wherein the leveling means comprises a taut cable rigidly attached to the drums a like distance from the respective central-axes whereby the drums are forced to revolve in equal angular extent during vertical movements of the top-frame.

3. The suspension system of claim 2 wherein the taut cable is of figure-8 configuration lying within a vertical-plane and the respective cable loops surrounding the central-axes whereby the drums rigidly attached thereto are forced to revolve in opposite angular directions during vertical movement of the top-frame.

4. The suspension system of claim 3 wherein the connection between top-frame and the respective drums is through sheet material strips partially wrapped around and terminally attached to each drum, and terminally attached strips on respective drums facing each other to ensure opposite angular rotations of the drums during vertical movement of the top-frame.

5. The suspension system of claim 4 wherein there is a pair of transversely separated arcuately wrapped sheet material strips terminally attached to each drum, the figure-8 cable being attached to the drum between said sheet material strips; wherein the horizontal bottom-frame is of generally rectangular configuration and the drums directly underly the top-frame; and wherein there are upward-movement limitation means for the top-frame relative to the constant elevation bottom-frame.

6. The suspension system of claim 1 wherein the downward-movement limitation means possess progressively increasing resistance to the downwardly moving top-frame.

7. The suspension system of claim 6 wherein the downward-movement limitation means comprises a gaseous type shock-absorber having a constant gaseous molecular content and acting in accordance with Boyles' Law, the shock-absorber being rigidly attached to the drums radially outwardly from the central-axes with at least one longitudinally extending horizontal band whereby the fixed molecular content of confined gas both compresses and gradually increases in pressure as the drums are forced to rotate by the downwardly moving top-frame thereby providing progressively increasing resistance thereto.

8. The suspension system of claim 7 wherein the shock-absorber comprises a pair of horizontal telescoping and slidably engaged tubes and each tube carrying an upright terminal pulley; and wherein there is a single cable-band passing around both pulleys and connecting the telescoping tubes type piston to the respective drums whereby top-frame downward-movement tends to compress the telescoping tubes into each other against the resistance of the confined gas.

9. The suspension system of claim 8 wherein compressed air is supplied into the telescoping tubes type shock-absorber through an intervening load-leveler valve equipped with an air exhaust-port and also with a generally horizontal lever located below the top-frame and for controlling the proportion of air exhausted from the load-leveler valve, there being an upright pivotal link connection between the lever and the overlying top-frame to permit a comfortable underlying support for reclining persons of various body weights.

* * * * *